United States Patent
Vydhynathan et al.

(10) Patent No.: US 8,036,522 B2
(45) Date of Patent: Oct. 11, 2011

(54) METHOD AND SYSTEM FOR AUTO-FOCUSING

(75) Inventors: Raja Vydhynathan, Bangalore (IN); Venkat Ramana Peddigari, Secunderabad (IN); Mayank Mangla, Bangalore (IN); Ranjith Parakkal, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/580,293

(22) Filed: Oct. 16, 2009

(65) Prior Publication Data

US 2010/0310248 A1    Dec. 9, 2010

(30) Foreign Application Priority Data

Jun. 4, 2009    (IN) ............................ 1320/CHE/2009

(51) Int. Cl.
  *G03B 3/10*    (2006.01)
  *G03B 13/34*   (2006.01)
  *H04N 5/232*   (2006.01)
(52) U.S. Cl. .................. 396/124; 396/121; 348/349
(58) Field of Classification Search .................. 396/124, 396/121–123; 348/350
  See application file for complete search history.

(56) References Cited

U.S. PATENT DOCUMENTS

2008/0068487 A1*    3/2008    Morita ................. 348/333.05

OTHER PUBLICATIONS

Wei You, Hao Jiang, ZE-Nian Li, "Real-time multiple object tracking in smart environments", IEEE, pp. 818-823, 2008.
Vidit Saxena, Sarthak Grover, Sachin Joshi, "A Real Time Face Tracking System using Rank Deficient Face Detection and Motion Estimation", IEEE 7th International Conference, pp. 1-6, Sep. 9-10, 2008.
M. Gamadia, N. Kehtarnavaz, "A real-time continuous automatic focus algorithm for digital cameras", IEEE Southwest Symposium on Image Analysis and Interpretation, pp. 163-167, 2006.
Ng Kuang Chern, Nathaniel, Poo Aun Neow and Marcelo H. Ang Jr., "Practical Issues in pixel-based autofocusing for machine vision", IEEE, pp. 2791-2796, 2001.
M. Rubino, A. Cruz, J.R. Jimenez, F. Perez and E. Hitan, "An original device for the automatic measurement of the luminance distribution in an observer's visual field" Meas. Sci. Techno. vol. 7, pp. 42-51, 1996.

* cited by examiner

*Primary Examiner* — Rochelle-Ann J Blackman
(74) *Attorney, Agent, or Firm* — Mima Abyad; Wade J. Brady, III; Frederick J. Telecky, Jr.

(57) ABSTRACT

Method and system for auto-focusing. The method includes checking for presence of a subject in a first frame. The method also includes determining a second frame indicative of an in-focus position of the subject if the presence of the subject is detected. The method further includes causing to focus on the subject based on the second frame. Further, the method includes checking for a change in at least one of location of the subject in the second frame, and sharpness and luminance in an area corresponding to the subject in the second frame. Moreover, the method includes causing to refocus on the subject if the change is detected.

15 Claims, 3 Drawing Sheets

METHOD AND SYSTEM FOR AUTO-FOCUSING

REFERENCE TO PRIORITY APPLICATION

This application claims priority from Indian Provisional Application Serial No. 1320/CHE/2009 filed Jun. 4, 2009, entitled "CONTINUOUS AUTO FOCUS FOR CAMERAS", which is incorporated herein by reference in its entirety.

TECHNICAL FIELD

Embodiments of the disclosure relate to auto-focusing in electronic devices.

BACKGROUND

Over a period of time, automatic features in cameras that require minimal intervention of a user has gained demand. One such feature is continuous auto-focus that helps in keeping a predefined region in focus both during live preview and movie encoder applications without any user intervention. Existing continuous auto-focus methods in a camera focuses either on a central region or on a subject, in the central region, that is nearest to the camera. Often, it might happen that the subject, on which the user desires to focus, is not present in the central region or is not nearest to the camera, and hence leading to failure in focusing on the subject, on which the user desires to focus. In light of the foregoing discussion, there is a need for a method for auto-focusing, in cameras, that resolves one or more above-mentioned issues.

SUMMARY

An example of a method for auto-focusing includes checking for presence of a subject in a first frame. The method also includes determining a second frame indicative of an in-focus position of the subject if the presence of the subject is detected. The method further includes causing to focus on the subject based on the second frame. Further, the method includes checking for a change in at least one of location of the subject in the second frame, and sharpness and luminance in an area corresponding to the subject in the second frame. Moreover, the method includes causing to refocus on the subject if the change is detected.

Another example of a method for auto-focusing in a device includes checking for presence of a subject in a first frame. The method also includes determining a second frame indicative of an in-focus position of the subject if the presence of the subject is detected. The method further includes focusing on the subject based on the second frame. Further, the method includes checking for a change in one or more parameters associated with the subject in the second frame. Moreover, the method includes refocusing on the subject if the change is detected.

An example of a system for auto-focusing includes a sensor controller that enables checking for presence of a subject in any of a plurality of regions. The plurality of regions comprises a non-central region. The system also includes an image signal processor responsive to the checking to generate an image of the subject, if the subject is detected. The system further includes a statistics engine responsive to the checking to determine one or more parameters associated with the subject, if the subject is detected. Further, the system includes a processing unit responsive to the one or more parameters and the image to determine an in-focus position of the subject, to cause to focus on the subject based on the in-focus position, to check for a change in the in-focus position, and to cause to refocus on the subject, if the change is detected.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the disclosure.

DETAILED DESCRIPTION OF THE EMBODIMENTS

Figure 1:
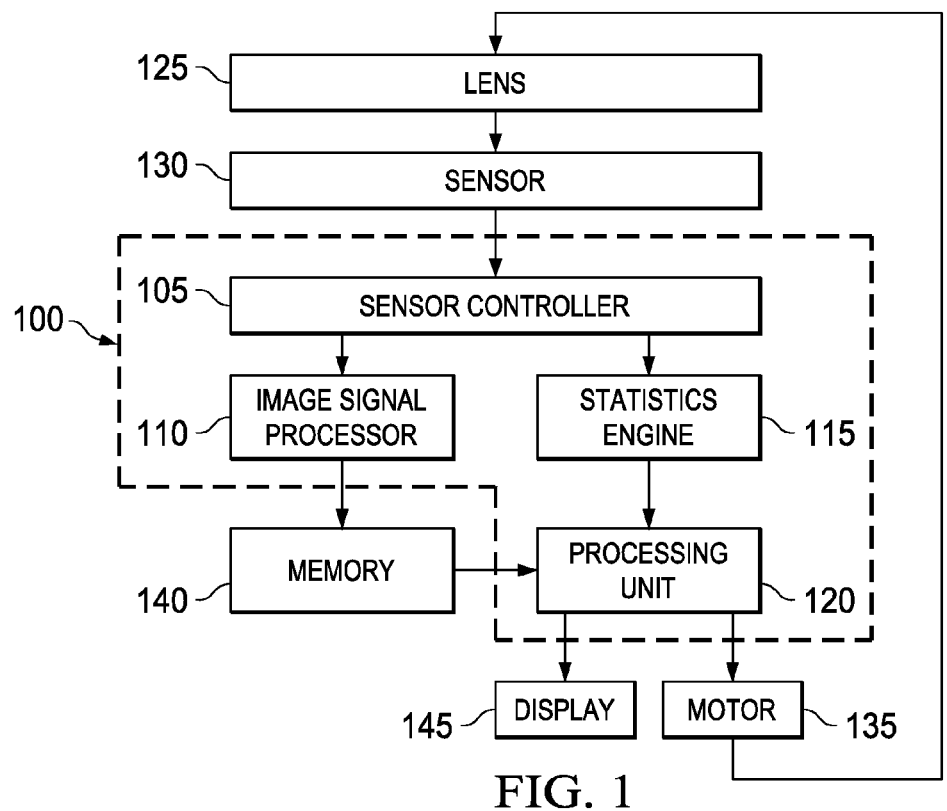
FIG. 1 is a block diagram of a system for auto-focusing, in accordance with one embodiment.

FIG. 1 illustrates a system 100 for auto-focusing. The auto-focusing can be defined as a feature of a system that maintains automatic focus on a subject. The system 100 can be included in an electronic device or can be coupled to the electronic device. Examples of the electronic device include, but are not limited to, a camera, a television camera, a video camera, a mobile device, a laptop, a webcam and a computer.

The system 100 is coupled to a lens 125, a sensor 130, and a motor 135. The lens 125, the sensor 130, and the motor 135 can be included in the electronic device. The lens 125 is a variable focus lens that defines an area. The variable focus lens can be defined as a lens in which focal length is variable. The sensor 130 is coupled to the lens 125. The sensor 130 enables checking for presence of a subject in the area. The subject can be defined as a portion in the area that a user desires to auto-focus on. The area includes a plurality of regions. The regions include a central region and a non-central region. The sensor 130 enables checking for the presence of the subject in any of the regions. The sensor 130, for example a a charge-coupled device (CCD) sensor or a complementary metal oxide semiconductor (CMOS) sensor, receives light as an input and provides a digital output.

The system 100 includes a sensor controller 105 coupled to an image signal processor 110 and a statistics engine 115. The statistics engine is coupled to a processing unit 120. The sensor controller 105 controls the sensor 130 to enable checking for presence of the subject in any of the regions. The image signal processor 110 is responsive to the checking to generate an image of the subject, if the subject is detected. The statistics engine 115, for example a H3A engine, is responsive to the checking to determine one or more parameters associated with the subject, if the subject is detected. The processing unit 120 is responsive to the one or more parameters and the image to determine an in-focus position of the subject. The processing unit 120 also causes the lens 125 to focus on the subject based on the in-focus position. The processing unit 120 is in electronic communication with the motor 135 that controls the lens 125. The processing unit 120 further checks for a change in the in-focus position, and causes the lens 125 to refocus on the subject, if the change is detected. The motor 135 is responsive to detection of the change in the in-focus position of the subject to adjust the lens 125 to refocus on the subject. The change in the in-focus position can be detected, for example, due to change in location of the subject or due to change in sharpness and luminance in an area associated with or corresponding to the subject. In some embodiments, the area corresponding to the subject can be different from the area defined by the lens 125. The area corresponding to the subject can be a subset of the area defined by the lens 125.

The system 100 can also include or be coupled to a memory 140. The memory 140 is responsive to the detection of the subject to store the image. In some embodiments, the memory 140 can also store data associated with the image. The memory 140 can be included in the electronic device or be coupled to the electronic device.

The system 100 can also be coupled to a display 145. Examples of the display 145 include, but are not limited to, a cathode ray tube (CRT) or a liquid crystal display (LCD). The display 145 can be included in the electronic device or be coupled to the electronic device.

Figure 2:
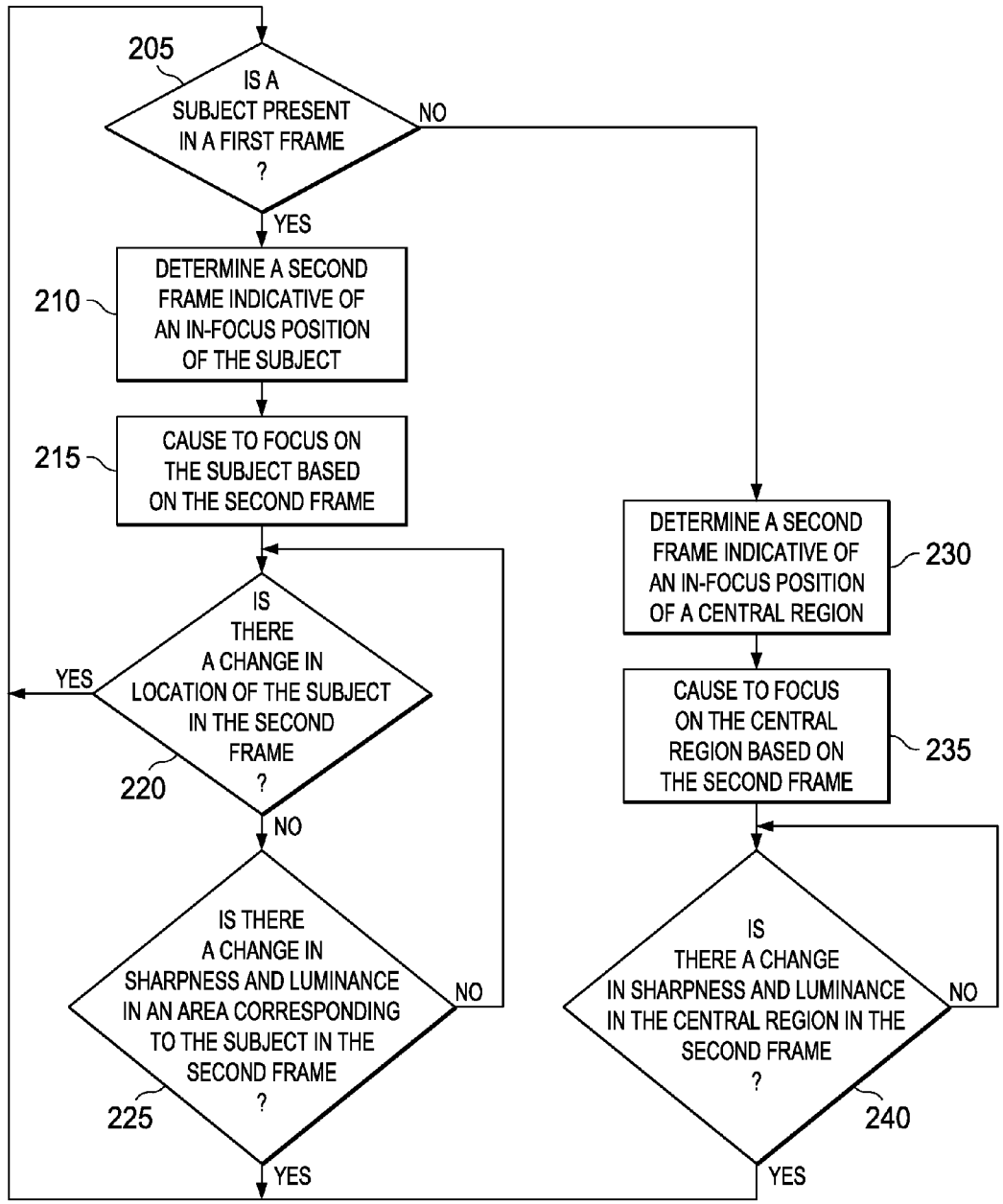
FIG. 2 is a flow diagram illustrating a method for auto-focusing, in accordance with one embodiment.

FIG. 2 is a flow diagram illustrating a method for auto-focusing. In some embodiments, the auto-focusing can be performed by a circuit having capability of being coupled to a variable focus lens, hereinafter referred to as the lens.

At step 205, presence of a subject is checked in a first frame. The first frame can be defined as a frame corresponding to a view or an area defined by the lens. The first frame includes a central region and a non-central region. The first frame can be divided into several windows. Various techniques can be used for checking the presence of the subject and corresponding location based on the windows. Examples of the techniques include, but are not limited to, a technique described in publication "Real-time multiple object tracking in smart environments" by Wei You, Hao Jiang, and Ze-Nian Li published in IEEE, Pages: 818-823, Year of Publication: 2008; and publication "A real time face tracking system using rank deficient face detection and motion estimation" by Vidit Saxena, Sarthak Grover, and Sachin Joshi published in IEEE, which are incorporated herein by reference in their entirety.

In some embodiments, options can be provided to a user of an electronic device including the lens and the circuit. The user can then select an option indicative of the subject on which the user desires to focus. For example, the user can select human face or a football as the subject. The selection can be performed in various ways, for example through a touch screen or a keypad.

In some embodiments, several instances of the subject can be detected. For example, if human face is the subject for focusing and the area defined by the lens includes a football stadium then several human faces can be detected in the first frame and can be referred to as several instances of the human face (subject). The human face (instance) that is nearest to the electronic device including the lens can then be detected as the subject and the windows including such human face can be referred to as the area corresponding to the subject.

If the presence of the subject is detected at step 205, a second frame indicative of an in-focus position of the subject is determined at step 210, else step 230 is performed. The second frame can be defined as a frame having maximum sharpness in the area corresponding to the subject. A search is conducted in the area corresponding to the subject for determining the second frame.

The area corresponding to the subject in a frame subsequent to the first frame, in a first direction, is checked for sharpness. If the sharpness in the area corresponding to the subject in the frame subsequent to the first frame, in the first direction, is less than that of the area corresponding to the subject in the first frame then a frame subsequent to the first frame in a second direction is considered. If the sharpness in the area corresponding to the subject in the frame subsequent to the first frame, in the first direction, is not less than that of the area corresponding to the subject in the first frame then the search is continued in the first direction. The second frame can be determined by searching for increase in the sharpness in the area corresponding to the subject. The frame having maximum sharpness in the area corresponding to the subject can then be determined as the second frame. For example, the area corresponding to the subject can include two windows W1 and W2. Sharpness values for the two windows in the first frame, corresponding to a first focus position fp, can be determined as S1 and S2. Sharpness values for the two windows in the frame subsequent to the first frame, and corresponding to a second focus position fp+δ in the first direction, can be determined as S1" and S2". The frame subsequent to the first frame can be reached by moving a motor of the electronic device by a step size δ. A sign of a difference between the sharpness values (S1" and S1, and S2" and S2) in the first frame and the frame subsequent to the first frame for each window can be determined. Based on the sign, a positive counter or a negative counter can be incremented. If the positive counter is greater than the negative counter, the search can be continued and the motor can be moved further by the step size δ in the first direction. Else, the direction is changed to the second direction.

In one aspect, the first direction corresponds to zooming in and the second direction corresponds to zooming out with respect to the subject. In another aspect, the first direction corresponds to near focal plane and the second direction corresponds to far focal plane with respect to the subject.

In some embodiments, the subsequent frame can be N frames away from the first frame. For example, frame 1 can be the first frame and the subsequent frame can be frame 4 that is two frames away from the frame 1. The number of frames between the first frame and the subsequent frame can be referred to as a step size. The step size can be altered to control speed of detection of the second frame and hence, the in-focus position.

In some embodiments, it might happen that the frame having maximum sharpness, in the area corresponding to the subject, falls in frames that are skipped due to the step sizes. A search with reduced step size can then be performed to determine the frame having maximum sharpness in the area corresponding to the subject as the second frame. The second frame is indicative of the in-focus position. The in-focus position can be defined as a focal plane, of the lens, in which the area corresponding to the subject has maximum sharpness.

At step 215, focusing on the subject, based on the second frame, is caused. The circuit causes the lens to focus on the subject in the focal plane corresponding to the second frame and leaving rest of the second frame out of focus or blurred. The circuit controls the motor that adjusts the lens to bring the subject in the in-focus position.

At step 220, a check is performed for a change in one or more parameters, for example location of the subject in the second frame. If the change in the location of the subject is detected then refocusing on the subject is caused. Step 210 to step 215 are then performed. The lens is controlled by the circuit using the motor and adjusted to refocus on the subject.

If the change in the location of the subject is not detected then step 225 is performed. At step 225, a check is performed for a change in the parameters, for example sharpness and luminance in the area corresponding to the subject in the second frame. If the change in the sharpness and the luminance in the area corresponding to the subject is detected then refocusing on the subject is caused. Step 205 to step 215 are then performed. The lens is controlled by the circuit using the motor and adjusted to refocus on the subject. If the change in the sharpness and the luminance in the area corresponding to the subject is not detected then focusing on the subject is performed based on the second frame until the change in any of the parameters is detected. The sharpness and luminance can be estimated in a section including one or more windows where the presence of the subject is detected. In one embodiment, if the sharpness of the section exceeds a threshold then a change in the parameters is detected in the section. In another embodiment, if the sharpness of the section differs from that of other sections by a value greater than a predefined value then a change in the parameters is detected in the section. Various techniques can be used for checking change in the parameters. Examples of the techniques include, but are not limited to, a technique described in publication "A real-time continuous automatic focus algorithm for digital cameras" by M. Gamadia, and N. Kehtarnavaz published in IEEE Southwest Symposium on Image Analysis and Interpretation, Pages: 163-167, Year of Publication: 2006; in publication "Practical issues in pixel-based autofocusing for machine vision" by Ng Kuang Chern, Nathaniel, Poo Aun Neow, and Marcelo H. Ang Jr. published in IEEE, Pages: 2791-2796, Year of Publication: 2001; and in publication "An original device for the automatic measurement of the luminance distribution in an observer's visual field" by M Rubino, A Cruz, J R Jimenez, F Perez, and E Hita published in Meas. Sci. Technol., Volume: 7, Pages: 42-51, Year of Publication: 1996, which are incorporated herein by reference in their entirety.

It is noted that step 225 can be performed before step 220 or in parallel.

In some embodiments, presence of the subject is not detected at step 205 and a second frame indicative of an in-focus position of the central region is determined at step 230. The central region can be defined as a region including windows in middle row and middle column of the area defined by the lens. The technique for determining the second frame indicative of the in-focus position of the central region is similar to that described for step 210. Instead of considering the area corresponding to the subject the central region is considered.

In some embodiments, when a search for the in-focus position of the central region has been performed previously then the windows in which change in sharpness was greater than a certain threshold, when compared to previous sharpness, can be considered.

At step 235, focusing on the central region, based on the second frame, is caused. The circuit causes the lens to focus on the central region in the focal plane corresponding to the second frame. The circuit controls the motor that adjusts the lens to bring the central region in the in-focus position.

At step 240, a check is performed for a change in sharpness and luminance in the central region in the second frame. If the change in the sharpness and the luminance in the central region is detected then refocusing on the central region is caused. Step 205, step 230 and step 235 are then performed. The lens is controlled by the circuit using the motor and adjusted to refocus on the central region. If the change in the sharpness and the luminance in the central region is not detected then focusing on the central region is performed based on the second frame until the change is detected.

Figure 3:
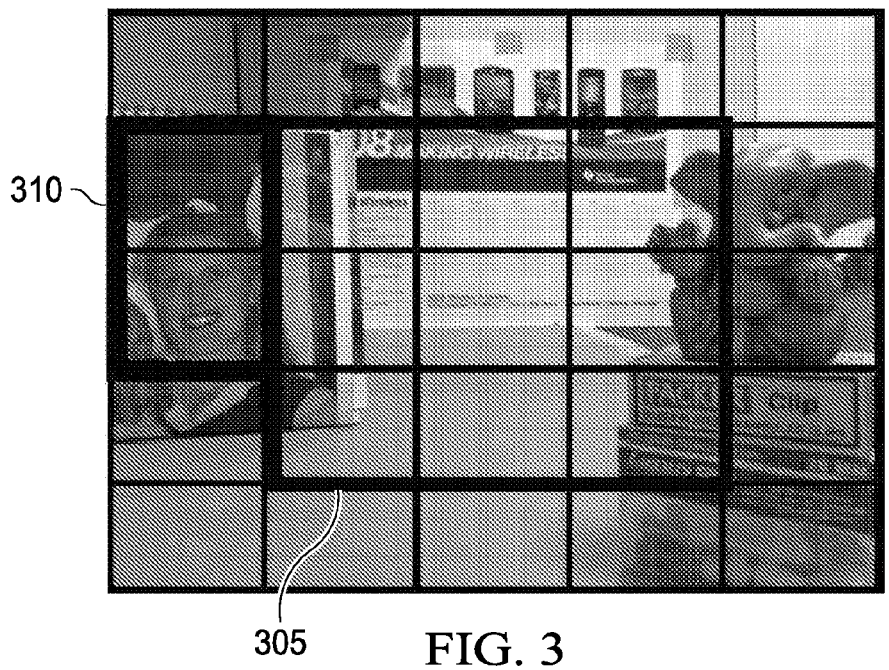
FIG. 3 is an exemplary illustration of an area defined by a lens, in accordance with one embodiment.

FIG. 3 is an exemplary illustration of the area defined by the lens 125. The area can be the first frame or the second frame. Each frame includes a central region 305 and a non-central region. During processing, the frame can be represented as a window grid which is divided into one or more windows. For example, the frame can be a 5×5 window grid with 5 rows and 5 columns. The windows including the subject, for example a human face, is determined as the area 310 corresponding to the subject. The windows in the center of the frame correspond to the central region 305.

In some embodiments, changes in the sharpness for each of the windows can be monitored to determine the in-focus position.

Figure 4:
FIG. 4 is an exemplary illustration of a frame, in accordance with one embodiment.
Figure 5:
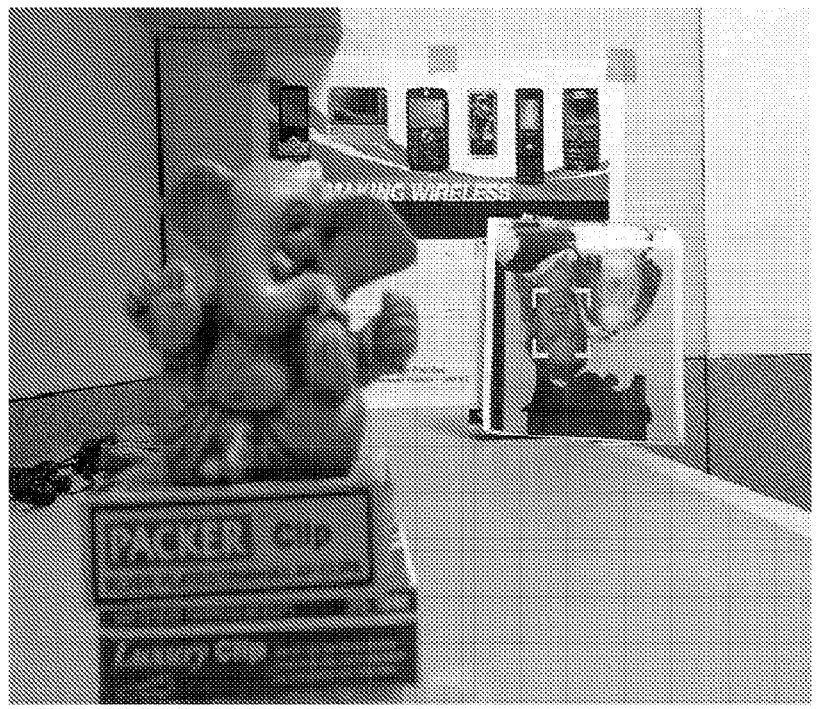
FIG. 5 is an exemplary illustration of a frame, in accordance with another embodiment.

FIG. 4 is an exemplary illustration of the frame, for example the second frame, which is focused on the subject, for example the human face, in the non-central region. FIG. 5 is an exemplary illustration of the frame, for example the second frame, which brings the subject into focus even if the subject is not nearer to the device as compared to a nearest subject, for example an idol, which occupies a larger area compared to other subjects in the frame.

In some embodiments, the subject can be detected even when the subject is aligned differently. A reticule can also be drawn around the detected subject for user interactional purposes.

Therefore, for a change in the location of the subject or in the sharpness and the luminance in the area corresponding to the subject, there is an improvement in refocusing time and responsiveness with minimal blur time. Further, the subject can be focused upon even when the subject is in the non-central region of the frame or when the subject is not the nearest subject.

In the foregoing discussion, the term "coupled or connected" refers to either a direct electrical connection between the devices connected or an indirect connection through intermediary devices. The term "signal" means data.

The foregoing description sets forth numerous specific details to convey a thorough understanding of embodiments of the disclosure. However, it will be apparent to one skilled in the art that embodiments of the disclosure may be practiced without these specific details. Some well-known features are not described in detail in order to avoid obscuring the disclosure. Other variations and embodiments are possible in light of above teachings, and it is thus intended that the scope of disclosure not be limited by this Detailed Description, but only by the Claims.

What is claimed is:

1. A method for auto-focusing, the method comprising:
checking for presence of a subject in a first frame;
determining a second frame indicative of an in-focus position of the subject if the presence of the subject is detected;
causing to focus on the subject based on the second frame;
checking for a change in at least one of location of the subject in the second frame, and sharpness and luminance in an area corresponding to the subject in the second frame; and
causing to refocus on the subject if the change is detected, wherein the refocus is dynamically changed based on the subject detection.

2. The method as claimed in claim 1, wherein checking for the presence of the subject comprises:
checking for the presence of the subject in at least one of a central region and a non-central region.

3. The method as claimed in claim 2, wherein determining the second frame comprises:
searching for increase in the sharpness, in the area corresponding to the subject, in a first direction; and
determining a frame having a peak in the sharpness, in the area corresponding to the subject, as the second frame.

4. The method as claimed in claim 3, wherein determining the second frame comprises:
   searching in a second direction if the sharpness, in the area corresponding to the subject, in a subsequent frame is lesser than that of the first frame.

5. The method as claimed in claim 1, wherein the auto-focusing is performed in a circuit having capability of being coupled to a variable focus lens.

6. The method as claimed in claim 1 and further comprising:
   determining the second frame indicative of the in-focus position of the central region, if the presence of the subject is not detected;
   causing to focus on the central region based on the second frame;
   checking for a change in sharpness and luminance in the central region in the second frame; and
   causing to refocus on the subject if the change is detected.

7. A method for auto-focusing in a device, the method comprising:
   checking for presence of a subject in a first frame;
   determining a second frame indicative of an in-focus position of the subject if the presence of the subject is detected;
   focusing on the subject based on the second frame;
   checking for a change in one or more parameters associated with the subject in the second frame; and
   refocusing on the subject if the change is detected, wherein the refocus is dynamically changed based on the subject detection.

8. The method as claimed in claim 7, wherein the device comprises a variable focus lens.

9. The method as claimed in claim 7, wherein checking for the presence of the subject comprises:
   detecting an instance, that is nearest to the device from a plurality of instances of the subject in the first frame, as the subject in the first frame.

10. The method as claimed in claim 7, wherein checking for a change in the one or more parameters comprises checking for a change in at least one of:
    location of the subject in the second frame; and
    sharpness and luminance of an area corresponding to the subject in the second frame.

11. A system for auto-focusing, the system comprising:
    a sensor controller that enables checking for presence of a subject in any of a plurality of regions, the plurality of regions comprising a non-central region;
    an image signal processor responsive to the checking to generate an image of the subject, if the subject is detected;
    a statistics engine responsive to the checking to determine one or more parameters associated with the subject, if the subject is detected; and
    a processing unit responsive to the one or more parameters and the image to
      determine an in-focus position of the subject,
      cause to focus on the subject based on the in-focus position,
      check for a change in the in-focus position, and
      cause to refocus on the subject, if the change is detected, wherein the refocus is dynamically changed based on the subject detection.

12. The system as claimed in claim 11, wherein the system is coupled to:
    a lens that defines an area;
    a sensor coupled to the lens; and
    a motor in electronic communication with the processing unit and responsive to detection of the change in the in-focus position to adjust the lens to refocus on the subject.

13. The system as claimed in claim 12, wherein the lens is a variable focus lens.

14. The system as claimed in claim 11 and further comprising:
    a memory responsive to the detection of the subject to store data associated with the subject.

15. The system as claimed in claim 11, wherein the system is comprised in a device, the device comprising a variable focusing lens.

* * * * *